H. GARRETT.
HINGE.
No. 29,480. Patented Aug. 7, 1860.
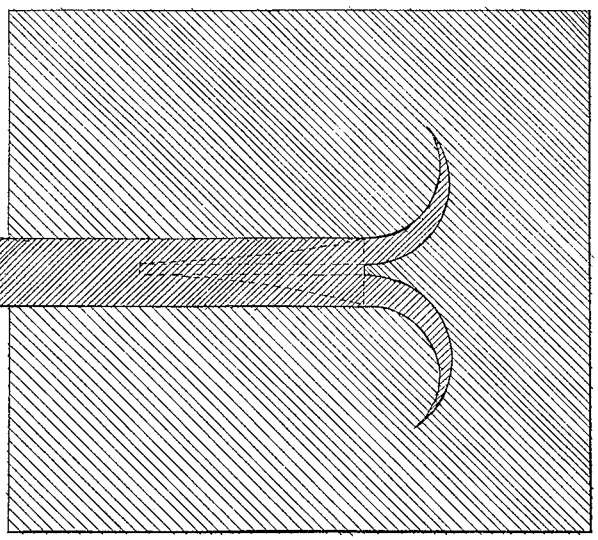
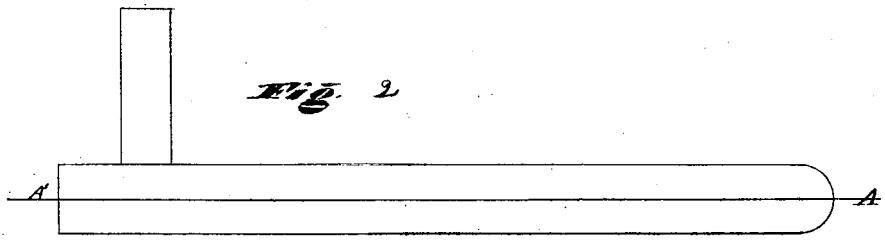
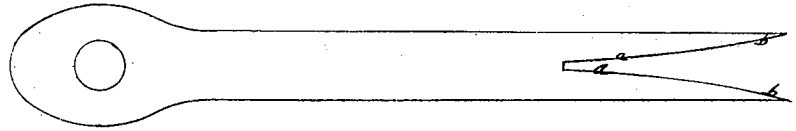

UNITED STATES PATENT OFFICE.

HENRY GARRETT, OF RICHMOND, MISSOURI.

SPIKE FOR HINGES.

Specification of Letters Patent No. 29,480, dated August 7, 1860.

*To all whom it may concern:*

Be it known that I, HENRY GARRETT, of Richmond, in the county of Ray and State of Missouri, have invented a new and useful Improvement in Hinges, usually termed "Spike-Hinges;" and I do hereby declare that the following is a full, clear, and exact description of the same, reference being had to the annexed drawing, making part of this specification, in which—

Figure 1 is a top view of the said hinge as improved; Fig. 2, a side elevation of the same, and Fig. 3, represents the hinge when driven home in the door post.

My invention consists in a new method of manufacturing spike hinges.

To enable others skilled in the arts to which my invention appertains to make and use the same, I will proceed to describe its construction and application.

Similar letters of reference represent corresponding parts of the drawing annexed.

The head end of the spike I make after the ordinary form, but the tail end I make different from anything I have hitherto seen or heard of—that is to say, I make the tail end of the spike in the form of a crotch, and the legs which constitute the crotch I make flaring on their inside by curving them from the junction of the crotch to their lower ends or points, as shown by the lines $a\ b$, but the outside of the crotch I make parallel with the body of the spike, so that it can slip into a hole made in the post to receive it.

Now to apply this spike, a hole must first be bored the distance it is intended to sink the spike in the wood—minus the length of the crotch. The spike is then driven home with a hammer, and by reason of the form of the prongs of the crotch, they are made to curl over in the wood in the manner shown in Fig. 3.

I claim—

Making the tail end of the spikes in the form of a crotch with the prongs thereof in the form described that they will turn in the wood as shown; and this, I claim not as a principle but as a new article of manufacture.

HENRY GARRETT.

Witnesses:
P. S. SMITH,
J. D. WALKER.